June 18, 1963  JUNJI FURUKAWA ETAL  3,094,509
METHOD OF PREPARING ACETALDEHYDE POLYMERS
Filed Dec. 8, 1959
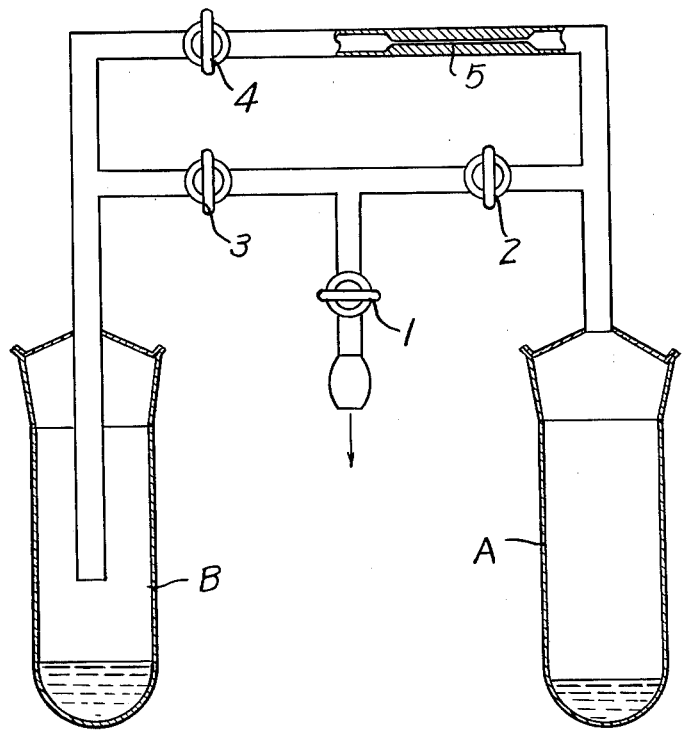
INVENTORS
JUNJI FURUKAWA
TAKEO SAEGUSA
HIROYASU FUJII
BY
*Irwin S. Thompson*
ATTY.

United States Patent Office 3,094,509
Patented June 18, 1963

3,094,509
METHOD OF PREPARING ACETALDEHYDE POLYMERS
Junji Furukawa, Sakyo-ku, Kyoto City, Takeo Saegusa, Kita-ku, Kyoto City, and Hiroyasu Fujii, Fukiai-ku, Kobe City, Japan, assignors to Zaidan Hojin Nihon Kagaku Seni Kenkyusho, Sakyo-ku, Kyoto City, Japan
Filed Dec. 8, 1959, Ser. No. 858,224
Claims priority, application Japan, Jan. 6, 1959
6 Claims. (Cl. 260—67)

The present invention relates to the production of acetaldehyde polymers having a high degree of polymerization, and more particularly to a method using alumina or metal oxides containing alumina as a catalyst.

As acetaldehyde polymers, paraldehyde (($CH_3CHO)_3$) and metaldehyde (($CH_3CHO)_{4-6}$) have heretofore been known. Furthermore productions of high polymers have been investigated in detail by M. W. Travers (refer to Trans. Farad. Soc. 32, p. 246 (1936)), M. Letort et al. (Compt. Rend. 202, p. 767 (1936)); 216 pp. 58 and 608 (1943); 224 p. 50 (1947), 231, p. 519 (1950); 240, p. 86 (1955); 241, p. 1765 (1955); 242, p. 371 (1956)), J. Chim. Phys. 48, p. 594 (1951), H. A. Rigby and others (J. Chem. Soc. 1948, p. 234) and J. C. Bevington (Proc. Roy. Soc. (London), A 196, p. 363 (1949)). All of these methods, however, should use liquid air, liquid oxygen or liquid nitrogen to cool acetaldehyde to a temperature below its freezing point ($-123.3°$ C.) because it is an essential requirement for the polymerization to freeze the monomer. It has been still unknown to obtain a high polymer without freezing the monomer.

The inventors have found that alumina and silica-alumina are excellent catalysts for the polymerization of acetaldehyde. If such a substance is used as a catalyst, a polymer having a very high degree of polymerization can be readily produced in a very high yield without freezing monomer.

Polyacetaldehyde obtained by this invention is an elastic mass, which can be used as an excellent material for the production of synthetic rubbers, synthetic resins or synthetic fibers with or without modification.

The catalysts capable of polymerizing acetaldehyde so easily without freezing have previously been unknown and it had not been anticipated.

In accordance with the former freezing methods, acetaldehyde vapor was introduced into a reaction vessel cooled to a temperature below the freezing point of acetaldehyde, or liquid acetaldehyde is frozen. In such a freezing method, the purity of acetaldehyde affects very greatly the polymerizataion, so that it is necessary to strictly purify the monomer.

There is further trouble that among impurities contained in monomer peracetic acid or acetic acid which is considered to be produced by oxidation of the monomer is a necessary catalyst in the freezing method, but the amount of the catalyst to be used must be controlled exactly because if there is too much peracetic acid or acetic acid it results in the decrease of the degree of polymerization of the polymer. The freezing method is further influenced by the procedure for carrying out the method and the rate of freezing in addition to the purity and the acid contents in the monomer and their regulations are very complicated. Even if these regulations are adequate, it is impossible to obtain the yield of polymerization of above 40%. Though in the freezing polymerization a fairly high yield of polymerization can be attained by using Lewis acid such as tin chloride or boron fluoride or hydrogen acid such as nitric acid or hydrochloric acid as a catalyst, yet the degree of polymerization of the polymer decreases and the acid substances have effect to reduce the stability of the polymer produced, and moreover it is impossible to remove completely the acid materials from the polymer, so that it is not preferable to use such acids as a catalyst.

On the other hand, in accordance with the present invention in which the polymerization is effected with alumina or metal oxides containing alumina, as a catalyst, it is neither necessary to purify the monomer so exactly nor to regulate so strictly the contents of peracetic acid and acetic acid, but a polymer having a high degree of polymerization can be obtained in a higher yield such as 91% than that attainable by the freezing polymerization. It has been proved by infra-red ray absorption spectrum that the polyacetaldehyde obtained by this invention has the structure of methyl polyoxymethylene. However it can be considered that a small amount of hydroxy group and groups other than the fundamental structure may be contained in end groups and others.

The accompanying drawing illustrates a diagrammatic view of an embodiment of the device for carrying out this invention.

The invention will be explained by the following examples:

*Example I*

Referring to the drawing, A represents a container for for acetaldehyde, B a polymerization tube, 1, 2, 3 and 4 represents cocks and 5 a capillary tube. 15 mls. (0.25 mol.) of acetaldehyde was placed in A and 5 grs. of alumina was placed in B. The alumina was prepared by hydrolysis of aluminum isopropoxide, and by calcination of the resulting aluminum hydroxide at about 800° C. for about 15 hours and grounding. After A and B were cooled by means of Dry-Ice-alcohol baths, cocks 1, 2, 3 and 4 were opened to evacuate the whole system at about 3 mm. Hg. Then the cocks 1, 2 and 3 were closed and alcohol-Dry-Ice bath was removed from A, so that the monomers in A were distilled and introduced into B through capillary tube 5, while B was maintained at a temperature of from $-68°$ to $-70°$ C. Monomer was distilled to B during about 1.5 hours. After maintaining B at a temperature of $-68$ to $-70°$ C. for 43 hours, the content was dissolved in acetone. Insoluble materials were removed by centrifuge, followed by addition of a small amount of β-naphthylamine (stabilizer) and the mixture was then poured into water to precipitate the polymer. After drying in vacuo 10.1 grs. of a white non-tacky elastic product was obtained.

Polymerization conversion: 91%, the intrinsic viscosity in methylethylketone: 5.40 at 27.6° C. The degree of polymerization was calculated by the following formula by Bovey et al. (J. Polymer Sci. 14, p. 113 (1954)) to be about 33,000.

$$(\eta) = 5.36 \times 10^{-4} M^{0.65}$$

*Example II*

Acetaldehyde was polymerized in the same method as Example I by means of alumina obtained by calcination at 400° C. aluminum hydroxide which was produced from aluminum isopropoxide, then resulted in 49% of conversion, the intrinsic viscosity of the polymer of 70.7, and the degree of polymerization about 50,000.

*Example III*

By using alumina obtained by calcination of aluminum hydroxide at 600° C. as a catalyst in the similar manner to Example I, 6.05 grs. of the polymer were obtained. The intrinsic viscosity was 7.17 (polymerization degree: 52,000).

*Example IV*

When polymerization was made by alumina obtained by calcination of aluminum hydroxide at 1,000° C. in the similar manner of Example I, the yield of polymer was 8.36 grs. (yield 76%).

Example V

The polymerization was effected for 65 hours in the similar manner to Example I by means of commercial alumina granules (8–14 meshes) which was not particularly calcined, then 2.53 grs. of the polymer were obtained. The intrinsic viscosity: 3.88 (polymerization degree: 17,500).

Example VI

The polymerization was performed in the similar manner to Example V by using the catalyst obtained by calcination of commercial alumina granules (8–14 meshes) at 600° C. for 15 hours, then yielded 7.26 grs. of polymer. The intrinsic viscosity: 2.40 (polymerization degree: 9,400).

Example VII

The polymerization was performed in the similar manner to Example VI by using the catalyst obtained by calcination of commercial alumina granules (8–14 meshes) at 1,000° C., then obtained 6.93 grs. of polymer. The intrinsic viscosity: 4.07 (polymerization degree: 21,000).

Example VIII

The polymerization was performed at −184° C. (by cooling by means of liquid nitrogen) by using the same catalyst as in Example VI, then yielded 3.74 grs. of the polymer. The intrinsic viscosity: 4.35 (polymerization degree: 23,500).

Example IX 15 mls. of acetaldehyde and 20 mls. of hexane were cooled in Dry-Ice-alcohol bath to a temperature of −68 to −70° C. and then 5 grs. of commercial alumina granules (8–14 meshes) calcined at 600° C. were added thereto little by little, after which the mixture was maintained at a temperature of −68 to −70° C. for 65 hours, then obtained 1.06 grs. of the polymer. The degree of polymerization was smaller than that obtained in Example I to VIII.

Example X

The polymerization was carried out in the similar manner to Example I by using 5 grs. of silica-alumina (SiO₂ 87%, Al₂O₃ 13% powder) as a catalyst for 20 hours, then 1.43 grs. of the polymer were yielded.

The above examples are taken to illustrate the invention by way of example and are not limitative of the invention.

In this invention a solvent is not always essential, but more satisfactory results can often be obtained without using any solvent. However, solvent may be used if necessary. If solvents are used, those which are inactive to the catalyst, the reactive material and the polymer and which are in the liquid state at the reaction temperature are preferable. Hydrocarbons are most suitable.

The reaction may be conducted at a temperature between the freezing point of acetaldehyde (−123.3° C.) and its boiling point, preferably −100 to −30° C. The preferred pressure is atmospheric pressure and may be above or lower.

The starting material of acetaldehyde monomer is not specially limited, but a solution of paraldehyde or acetaldehyde, and acetal or hemiacetal can be used.

As a catalyst alumina and metal oxides containing alumina such as silica-alumina can be used. They can be used in any form of powder, particle, lump or others. The method of producing these substances is not particularly restricted. The composition and alumina content of alumina-containing oxides such as silica-alumina are also not specially restricted, and they may contain one or more compositions other than alumina. The amount of the catalyst to be used is not restricted.

A most satisfactory result can be obtained in polymerization by introducing acetaldehyde vapor on the above mentioned catalyst and condensing thereon, after which it is made to contact with the catalyst for a given time. However as an alternative, the polymer may be obtained by adding liquid acetaldehyde itself or its solution to the catalyst, or adding the catalyst to liquid acetaldehyde or its solution, and by keeping the mixture at a given temperature for a given time.

What we claim is:

1. Method of producing acetaldehyde polymer having high degree of polymerization, which comprises condensing acetaldehyde vapor on a catalyst consisting of alumina at a temperature between the freezing point of acetaldehyde and its boiling point, and keeping the condensate in contact with the catalyst.
2. A method according to claim 1, in which the catalyst is added to acetaldehyde in liquid state.
3. A method according to claim 1, in which the catalyst is added to a solution of acetaldehyde.
4. A method according to claim 1, in which acetaldehyde in a liquid state is added to the catalyst to polymerize the acetaldehyde.
5. A method according to claim 1, in which acetaldehyde solution is added to the catalyst to polymerize the acetaldehyde.
6. A method according to claim 1 in which the acetaldehyde vapor is condensed at a temperature between −100 and −30° C.

References Cited in the file of this patent

UNITED STATES PATENTS

| | | |
|---|---|---|
| 1,864,908 | Jaeger | June 28, 1932 |
| 2,549,508 | Mottern | Apr. 17, 1951 |

OTHER REFERENCES

Furukawa et al.: Makro Chem., vol. 33, pages 32–40, September 1959.